(12) United States Patent
Graham

(10) Patent No.: US 7,089,304 B2
(45) Date of Patent: Aug. 8, 2006

(54) METERED INTERNET USAGE

(75) Inventor: John C. Graham, Palo Alto, CA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 09/943,766

(22) Filed: Aug. 30, 2001

(65) Prior Publication Data

US 2003/0046409 A1  Mar. 6, 2003

(51) Int. Cl.
*G06F 15/173* (2006.01)
*G06F 15/16* (2006.01)

(52) U.S. Cl. .................. 709/224; 709/203; 709/223; 709/229

(58) Field of Classification Search ............... 709/229, 709/225, 224
See application file for complete search history.

(56) References Cited

U.S. PATENT DOCUMENTS

| | | | | |
|---|---|---|---|---|
| 5,987,424 | A * | 11/1999 | Nakamura | 705/14 |
| 6,018,619 | A * | 1/2000 | Allard et al. | 709/224 |
| 6,055,575 | A * | 4/2000 | Paulsen et al. | 709/229 |
| 6,092,191 | A * | 7/2000 | Shimbo et al. | 713/153 |
| 6,119,227 | A * | 9/2000 | Mao | 713/171 |
| 6,170,075 | B1 * | 1/2001 | Schuster et al. | 714/776 |
| 6,275,471 | B1 * | 8/2001 | Bushmitch et al. | 370/248 |
| 6,289,451 | B1 * | 9/2001 | Dice | 713/168 |
| 6,615,258 | B1 * | 9/2003 | Barry et al. | 709/223 |
| 6,651,099 | B1 * | 11/2003 | Dietz et al. | 709/224 |
| 6,778,509 | B1 * | 8/2004 | Ravishankar et al. | 370/322 |

OTHER PUBLICATIONS

Nakamura, M.; Sato, M.; Hamada, T.; A Pricing and Accounting Software Architecture for QOS Guaranteed Services on a Multidomain Network, *Electronics and Communications in Japan, Part 1 (Communications)*, vol. 84, No. 3, pp. 38-47.

Rizzo, M.; Briscoe, B.; Tassel, J.; Damianakis, K.; A Dynamic Pricing Framework to Support a Scalable, Usage-Based Charging Model for Packet-Switched Networks, *Active Networks, First International Working Conference, IWAN '99 Proceedings*, pp. 48-59.

Anand, S.S.; Kasturi, K.; Sriram, G.; Accounting Architecture for Cellular Networks, *1996 IEEE International Conference on Personal Wireless Communications Proceedings and Exhibition—Future Access(Cat. No. 96TH8165)*, pp. 184-189.

(Continued)

*Primary Examiner*—Zarni Maung
*Assistant Examiner*—Kamal Divecha
(74) *Attorney, Agent, or Firm*—Workman Nydegger

(57) ABSTRACT

Methods, systems and computer program products for tracking a client's usage of one or more services provided by one or more servers. A client generates and sends one or more metering packets to a census service. Each metering packet includes a time element indicating the client's usage of the one or more services. The time element may include a charged time portion and a free time portion. An authentication element may be included with each metering packet so that the census service can determine whether or not a given metering packet is genuine. A login service communicates to the client whether or not usage should be tracked and indicates a time interval to expire between subsequent metering packets. A session identifier in each metering packet allows multiple sessions to be tracked simultaneously. Upon receiving metering packets, the census service discards redundant metering packets and updates a usage database accordingly.

40 Claims, 6 Drawing Sheets

OTHER PUBLICATIONS

Kumar, B.; Effect of Packet Losses on End-User Cost in Internetworks With Usage Based Charging, *Computer Communication Review*, vol. 23, No. 2, pp. 9-15.

Estrin, D.; Zhang, L.; Design Considerations for Usage Accounting and Feedback in Internetworks, *Integrated Network Management, II. Proceedings of the IFIP TC6/WG6.6 Second International Symposium,* pp. 719-733.

* cited by examiner

METERED INTERNET USAGE

CROSS-REFERENCE TO RELATED APPLICATIONS

N/A

BACKGROUND OF THE INVENTION

1. The Field of the Invention

The present invention relates to the usage of computer services. More specifically, the present invention relates to methods, systems and computer program products for tracking a client's usage of one or more services provided by one or more servers.

2. Background and Related Art

With the exception of certain educational institutions and governmental entities, most access to the Internet is indirect. That is, rather than being directly connected to the Internet, most access the Internet through some intermediary, known as an Internet Service Provider or ISP. An ISP may provide various levels of service depending on the particular needs of its customers. For example, individual customers may access the Internet through a dialup telephone line, a broadband cable, or perhaps a broadband wireless connection. Many individual customers typically share an ISP's connection resources, at least to some extent. In contrast, business users often prefer a dedicated ISP connection with a fairly constant bandwidth.

An ISP may provide various "points of presence" for connecting to the Internet. Depending on the ISP, these points of presence may include local telephone numbers, toll or toll free telephone access numbers, cable systems, microwave stations, etc. Cable systems and microwave systems are local by nature, but it is generally a significant advantage for an ISP to offer local telephone access to keep costs as low as possible, both for the ISP and its customers.

Although the number of computers with Internet access has grown tremendously, competition among ISPs can be quite fierce. As a result, ISPs often employ various service plans with aggressive pricing strategies to attract consumers, including businesses and individuals alike. Most service plans fall into one of two broad categories: (i) unlimited access for a fixed fee, and (ii) a certain number of hours for a fixed fee, with additional hours being billed as used. In either case, an ISP server is traditionally responsible for tracking a client's usage, if necessary.

However, traditional tracking suffers from at least two significant problems. First, tracking each client connected to an ISP may impose a considerable processing burden on a server. This burden may be especially pronounced where an ISP has offered only unlimited access for a fixed fee, but would like to begin providing a reduced service level that requires usage tracking. In such a case, tracking may require upgrading to more powerful servers in order to avoid an overall performance reduction. Given the rather competitive nature of the ISP market, much of the benefit gained in offering a variety of service levels may be substantially offset by the corresponding increased costs and/or diminished capacity.

The second problem is at least somewhat related to the first. In some circumstances, it may be desirable to distinguish between various types of access. More particularly, an ISP may wish to charge for access to one type of service, whereas access to another type of service may be without charge. Tracking this level of detail at the ISP, as compared to simply tracking raw connection time, imposes yet further performance loads on the ISP's computing resources. Here again, the tradeoffs, in terms of benefits versus associated costs, may be undesirable or even prohibitive.

In contrast to an ISP's computer resources, a client's computing resources may be comparatively underutilized. Furthermore, the overhead associated with having an individual client track its own usage of services is likely to represent a much less significant performance problem for the client. Whereas server-based tracking concerns the usage of each and every connected client, client-based tracking concerns the usage of an individual client, or perhaps a cluster of clients. As such, client-based tracking allows a substantial portion of the processing load to be borne by the client. While some type of centralized server tracking component may be useful in receiving and correlating usage information from individual clients, the server computer resources for implementing client-based tracking are likely to be significantly less than would be required in a comparable, substantially server-based, tracking implementation. Therefore, methods, systems and computer program products for tracking a client's usage of server services are desired.

BRIEF SUMMARY OF THE INVENTION

The present invention uses one or more client-generated metering packets to track a client's usage of one or more services provided by one or more servers. Metering packets may be generated by a client and sent to and received by a server over regular periodic intervals. Each metering packet includes a time element that indicates the client's usage of the provided services. The time element may include a charged time portion for access to services that incurs an access charge and a free time portion for access to services that does not incur an access charge. Metering packets also may include other elements, such as a packet type element, a sequence number element, a session identifier element, a packet authentication element, etc. Among other things, a packet type element may be used to indicate whether a packet is for an active session currently in progress or for a session that is ending.

When a communication protocol that does not guarantee delivery is used, sending redundant metering packets increases the likelihood that the information contained within any particular metering packet is received, even if one or more packets are lost. However, if packet delivery is successful, sending more than one metering packet with the same information may be redundant. A sequence number element may help identify any redundant metering packets that are received. Then, redundant metering packets may be discarded rather than processed to conserve computing resources. For example, a usage database may be updated to reflect the tracking information contained within a metering packet. Prior to updating the usage database, a cache of previously received metering packets may be searched, and if a metering packet with the same sequence number is found in the cache, a newly received metering packet can be identified as redundant and ignored. Otherwise, the usage database is updated with the tracking information in the newly received metering packet and the newly received metering packet is added to the cache. The sequence number element also may help determine if some metering packets have not been received.

Where multiple sessions are tracked, a session identifier element may be used to link a particular metering packet with a particular session. An authentication element may be used to assure that any given metering packet is genuine. For example, a session key may be associated with a specific session. Some of the tracking information within a metering packet and the session key may be hashed to generate an authentication element that is included within the metering packet. When the metering packet is received, the same tracking information and session key are hashed at the receiving end. Comparing the authentication element generated at the receiving end with the authentication element included within the metering packet determines whether or not the metering packet is genuine.

Upon receiving a login request from a client, a login service may check configuration data to determine if the client should track usage. The configuration data may include an indicator from a configuration database that indicates whether or not usage should be tracked for all clients who login and an indicator from a database of clients that indicates whether or not usage should be tracked for a particular client. Configuration data may be extended to indicate whether or not usage should be tracked for a particular session. If the configuration data dictates that usage should be tracked, the login service communicates to the client that the client should track its usage of the one or more services provided by one or more servers. For example, the login service may send one or more headers to the client to indicate that the client should track usage and communicate various usage tracking parameters.

While tracking usage, a client may terminate access to the services provided by the servers in any of a variety of ways, including hanging up, timing out, powering off, changing users, and logging off. In many circumstances, the client is able to send session-ending metering packets to indicate that a particular session is terminated. For example, when timing out, changing users or logging off, the client usually continues to operate and can send the appropriate session-ending packets without incident. However, in other circumstances, such as hanging up or powering off, the client may discontinue operation and be unable to send one or more session-end packets. Furthermore, metering packets may be sent over an unreliable transport protocol that does not guarantee delivery. Regardless of the motivation, the client may store metering information in non-volatile memory and then send the stored metering information in a subsequent session. This helps assure that usage tracking remains accurate even when there is some uncertainty as to whether or not a particular metering packet is received.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which.

DETAILED DESCRIPTION OF THE PREFERRED EMBODIMENTS

The present invention extends to methods, systems, and computer program products for tracking a client's usage of one or more services provided by one or more servers. By employing one or more client-generated metering packets to track the client's usage of the one or more services, the present invention avoids the otherwise substantial processing burden imposed by substantially server-based approaches. The client-generated metering packets also provide increased flexibility and enhanced accuracy, in terms of what usage incurs an access charge, how various types of session terminations are handled, and in determining when a session actually ends. The embodiments of the present invention may comprise a special-purpose or general-purpose computer including various computer hardware, as discussed in greater detail below.

Embodiments within the scope of the present invention also include computer-readable media for carrying or having computer-executable instructions or data structures stored thereon. Computer-executable instructions comprise, for example, instructions and data which cause a general-purpose computer, special-purpose computer, or special-purpose processing device to perform a certain function or group of functions. Such computer-readable media can be any available media that can be accessed by a general-purpose or special-purpose computer. By way of example, and not limitation, such computer-readable media may comprise RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general-purpose or special-purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Figure 1:
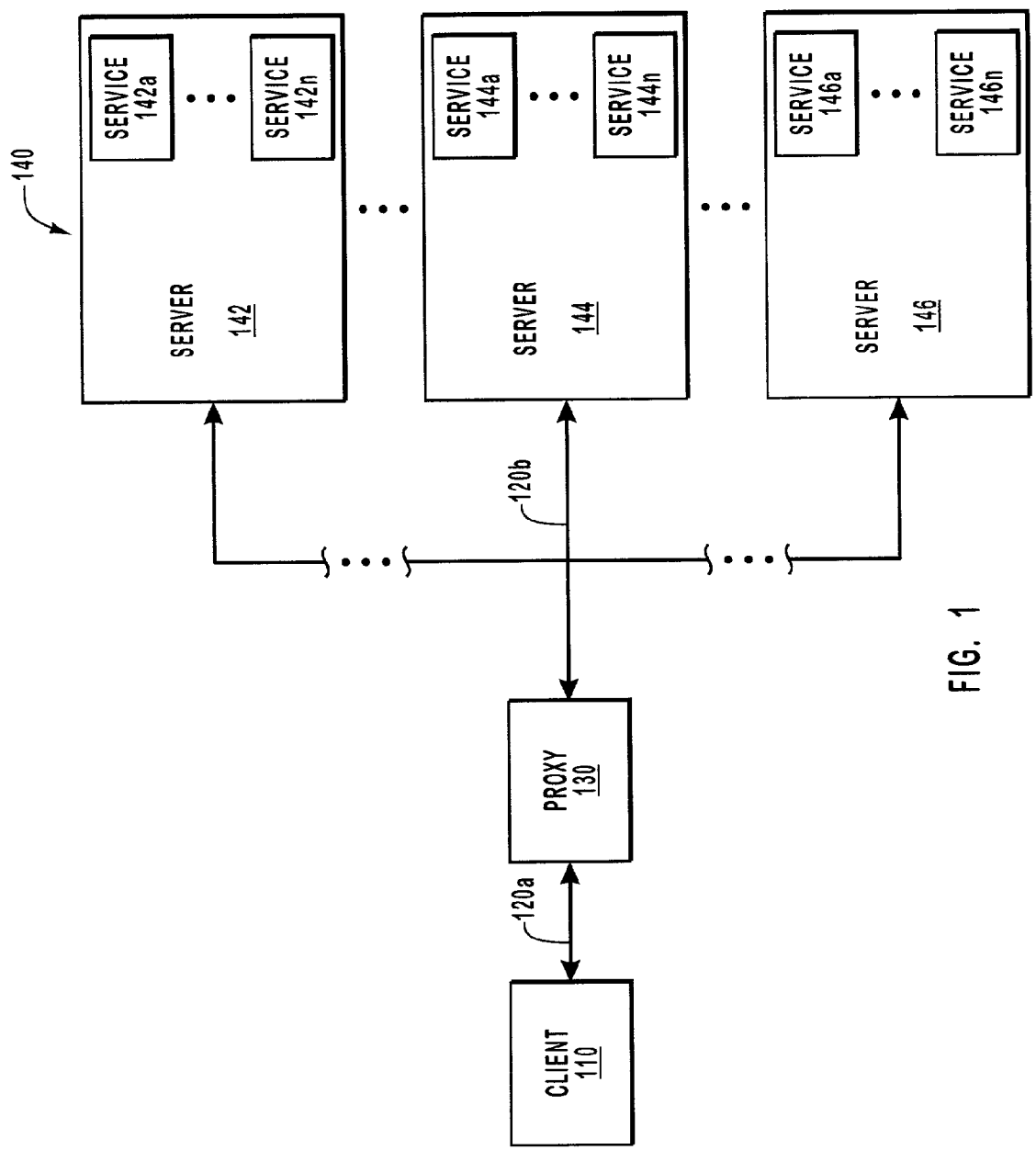
FIG. 1 illustrates an exemplary system that provides a suitable operating environment for the present invention.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention also may be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention may include client 110, proxy 130, and servers 140. Each of client 110, proxy 130, and servers 140 may be implemented as a general- or special-purpose computing device. Such a computing device may include a processing unit, system memory, and a system bus that couples various system components to the processing unit. A processing unit in combination with program code means is one example of a processor means. System memory may include read only memory (ROM), random access memory (RAM), non-volatile RAM, and/or any other type of memory.

The computing devices also may include a magnetic hard disk drive, a disk drive for reading from or writing to a removable media, such as magnetic disks, optical discs, or other magnetic/optical media. The drives are connected to the system bus by one or more drive interfaces. Drives and/or interfaces for other types of computer readable media for storing data also may be present, including magnetic cassettes, flash memory cards, digital versatile disks, Bernoulli cartridges, RAMs, ROMs, and the like. The drives, their associated computer-readable media, and certain types of memory may provide non-volatile storage of computer-executable instructions, data structures, program modules and other data for the computing devices. Program code means comprising one or more program modules may be stored at each of the computer devices, including an operating system, one or more application programs, one or more services, other program modules, and program data.

Client 110, proxy 130, and servers 140 operate in a networked environment using network connections 120a and 120b to communicate with each other. The network connections 120a and 120b depicted in FIG. 1 may comprise a local area network and/or a wide area network (WAN). Such networking environments are commonplace in office-wide or enterprise-wide computer networks, intranets and the Internet. In a LAN networking environment, network connections 120a and 120 may include a network interface or adapter, a modem, a wireless link, or other means for establishing communications over a network, such as the Internet. Network connections 120a and 120b are examples of communication means. It will be appreciated that the network connections shown are exemplary and other means for communicating over a network may be used.

In general, client 110 accesses one or more of the services 142a–142n provided by server 142, services 144a–144n provided by server 144, and services 146a–146n provided by server 146 through network connections 120a and 120b and proxy 130. It should be noted that the terms client, proxy, and server are not mutually exclusive and should be interpreted broadly. A client consumes resources, a server provides resources, and a proxy operates on behalf of either a client or a server. In many circumstances the designations of client, proxy, and server apply for a particular time and then change. For example, a client at one time may be a proxy or a server at another, and so on. It should also be noted that each of the servers 140 may be a cluster of servers, and that each individual server may provide one or more services or a particular service may be implemented across one or more servers. The present invention does not require any particular configuration.

Figure 2:
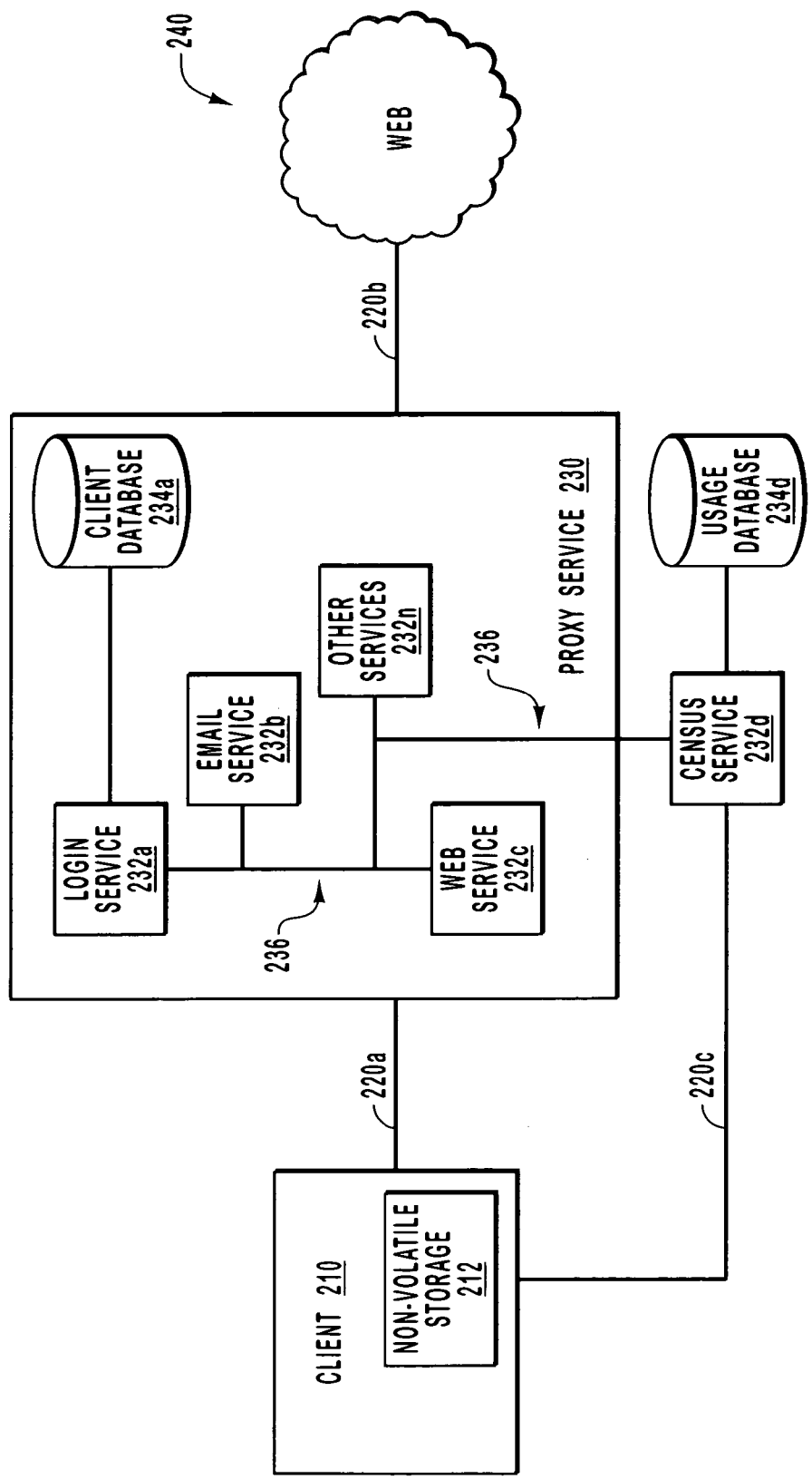
FIG. 2 illustrates an exemplary system according to the present invention.

Turning next to FIG. 2, tracking client's 210 usage of one or more services provided by proxy service 230 will be described in greater detail. Communication between client 210 and proxy service 230, within proxy service 230 over network connections 236, and between proxy service 230 and either web 240 or census service 232d, follows a request/response protocol. The HyperText Transfer Protocol ("HTTP") is one type of well-known request/response protocol. Communication between client 210 and census service 232d may use some other communication protocol, such as User Datagram Protocol ("UDP"). However, the present invention is in no way limited to the use of any particular communication protocol or any particular network topology.

Proxy service 230 includes a login service 232a. In one embodiment, login service 232a is a Unix daemon. Logging in to proxy service 230 is accomplished in two stages. During the first stage, a secure session is established between client 210 and proxy service 230 so that sensitive information may be exchanged. After the first login stage, the login service 232a checks a configuration database (not shown) to determine if usage tracking is enabled for clients attempting to login. The login service 232a also checks a client database 234a to determine if usage tracking is enabled for a particular client, such as client 210. For certain types of access, usage tracking may not be enabled.

If usage tracking is enabled, the login service 232a creates a unique session identifier for the new session with client 210. Those of skill in the art will recognize that the present invention may be particularly useful in environments where sessions are relatively short. For example, mobile devices, such as personal digital assistants and cellular telephones, which tend to have short sessions (due to airtime expenses and/or other factors), may be more likely to benefit from the present invention, than other devices, such as personal computers where sessions may be several hours or days. Nevertheless, the present invention is not necessarily limited to any particular session duration or environment.

A session key is negotiated between the login service and the client to enable secure communication between client and login service. As described in greater detail below, the login service sends a hash of the session key to a census service for use in authenticating metering packets. Hashing the session key provides an extra measure of security because the session key is not communicated to other systems—only the client and the login service know the key's value. As used in this application, the term "session key" should be interpreted broadly to encompass any value suitable for authentication. In one embodiment, the session key is hashed using a Message Digest 5 ("MD5") hash. The login service 232a also sends one or more headers to the client. The one or more headers include usage tracking parameters, such as an indication that the client should track usage, the unique session identifier, a metering interval indicating how frequently the client should send metering packets, etc. The configuration database may be used to configure the metering interval. In one embodiment, the metering interval is expressed as a number of seconds.

There are two types of metering packets: a session-in-progress metering packet and a session-ending metering packet. The session-in-progress indicates that a session continues to be active, whereas a session-ending packet indicates that a session has terminated. It should be noted that the present invention is not necessarily limited to any particular type of metering packets. When the time interval expires or when a session ends, client 210 sends one or more metering packets over network connection 220a. Redundant metering packets may be sent to increase the probability that they are received if an unreliable communication protocol is used. In one embodiment, three metering packets are sent using UDP. Each metering packet includes a sequence number so that redundant metering packets may be discarded.

Login service 232a sends the unique session identifier and the MD5 hash of the session key to census service 232d over network connections 236. Census service 232d receives the metering packets from client 210 over network connection 220c and uses the session identifier to track the client's usage of the services provided by proxy service 230, such as email service 232b, web service 232c, and other services 232n. As metering packets are received, the census service checks a cache of received metering packets so that redundant packets are not reflected in usage database 234d. Usage database 234d is one example of usage means for tracking at least one client's usage of one or more services. The size of the cache is configurable. In one embodiment, the census service is implemented as a Unix daemon.

The census service 232d is relatively simple. It does not maintain any state information for any client connections. Furthermore, policy decisions regarding valid sessions and billing are made in post-processing the usage database 234d. However, if a session-in-progress metering packet is received for an unknown session, an error is generated. Redundant metering packets are discarded to avoid unnecessary updates to usage database 234d. The census service 232d employs a master-children architecture. A master process accepts all requests from the login service and processes them upon receipt. The master process also accepts the metering packets from client 210 and dispatches them to the children for processing. The number of children is configurable and therefore enhances scalability.

Note that proxy service 230 also provides access to the web 240 (e.g., the World Wide Web) over network connection 220b. This access may be through web service 232c or may be directly between client 210 and web 240. For example, in one embodiment, secure connections between client 210 and web 240 bypass proxy service 230. Note that in these circumstances, it would not be practical for server-based usage tracking to monitor client's 210 secure access to web 240.

Hanging up, timing out, powering off, changing users, and logging off trigger client 210 to send one or more end-of-session metering packets. Because the session terminates, client 210 also stores the end-of-session metering packet in non-volatile storage 212. When power is restored, client 210 reconnects, or another user logs in, client 210 restores the prior session data (including the end-of-session metering packet) from non-volatile storage 212 and sends the prior session data to the login service 232a. Upon receiving the prior session data, login service 232a sends the session identifier for the new session and the prior session data to reinforce the end-of-session metering packets that were sent previously, but were not guaranteed to arrive. As noted earlier, in one embodiment metering packets are sent using UDP and even if sent, may not be delivered.

Census service 232d also may authenticate metering packets to determine whether or not each packet is genuine. Authentication may be accomplished by hashing at least a portion of each packet and the session key, and sending the hash value with the packet. For example, the client first hashes the session key so that the client and the census service 232d each have the same hash of the session key. (Recall that census service 232d received a hash of session key along with the session identifier from login service 232a.) The client then hashes the metering information in a metering packet and the hash of the session key to produce the hash value that can be used by the census service 232d to authenticate the metering packet. Upon receipt, the census service 232d performs a similar hash and compares the results with the hash value sent with the packet. If the two hash values do not match, the packet is not genuine. In one embodiment, the well-known MD5 algorithm, with a basic key known only to the client 210 and login service 232a, is used to generate the hash value. However, the present invention is not limited to any particular hashing algorithm or authentication scheme.

It should be noted that a hacker looking at metering packets would not be able to deduce much. First, even if all metering information is transmitted as cleartext, the hacker will not be able to associate a particular session identifier with a specific client. Furthermore, without the session key, the hacker will not be able to generate a correct hash value for altered or created metering packets. As a result, the metering packets and census service are not susceptible to a man-in-the-middle-attack.

Figure 3:
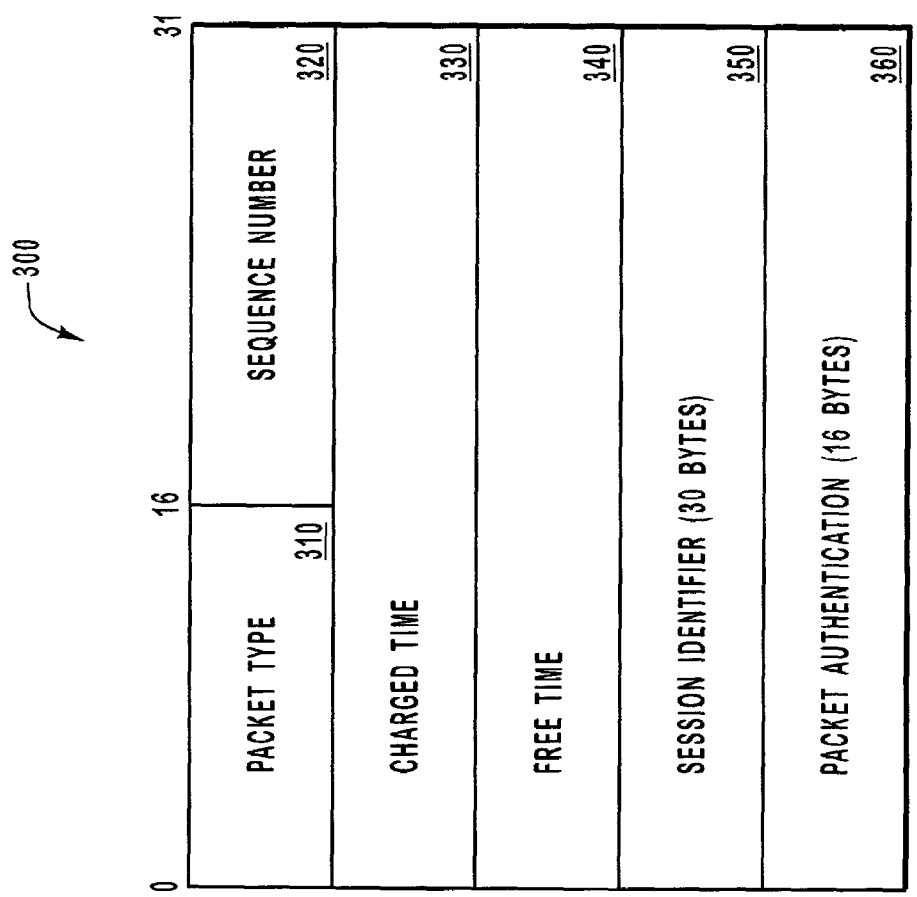
FIG. 3 is a block diagram showing the data structure of an exemplary metering packet according to the present invention.

FIG. 3 is a block diagram showing the data structure of an exemplary metering packet 300 according to the present invention. The metering packet is 58 bytes long and includes a packet type element 310, a sequence number element 320, a time element that includes a charged time portion 330 and a free time portion 340, a session identifier element 350, and a packet authentication element 360. Note that the packet type element 310 and sequence number element 320 are two bytes each, the change time portion 330 and free time portion 340 are four bytes each, the session identifier element 350 is 30 bytes, and the packet authentication element 360 is 16 bytes. Of course, the present invention is not necessarily limited to any particular metering packet size, content, or layout.

It should be noted that the charge time portion 330 and the free time portion 340 offer significant flexibility in billing client 210. It may be desirable for proxy service 230 to provide some access to one or more services without charge. Tracking this level of detail in a substantially server-based implementation may impose a significant processing burden on a server and thereby erode much of the benefit provided by offering free time. Those of skill in the art will recognize that a free time portion may not be needed if only the amount of time to charge is of interest. For example, in some embodiments it may be desirable to track how much free time one or more client use, whereas in another embodiment, only the amount of time to charge is relevant.

It also should be noted here, that the client tracks its own usage. In particular, the client determines what access falls within charge time portion 330 and what access falls within free time portion 340. In one embodiment, any access initiated automatically by the client, without user intervention, is accounted for in free time portion 340. For example, the client may initiate an automated download to receive a software update or other information. Nevertheless, the present invention is not necessarily limited to the use of any particular criteria in determining which access should be accounted for in the charge time portion 330 and which access should be accounted for in the free time portion 340.

The present invention also may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

Figure 4A:
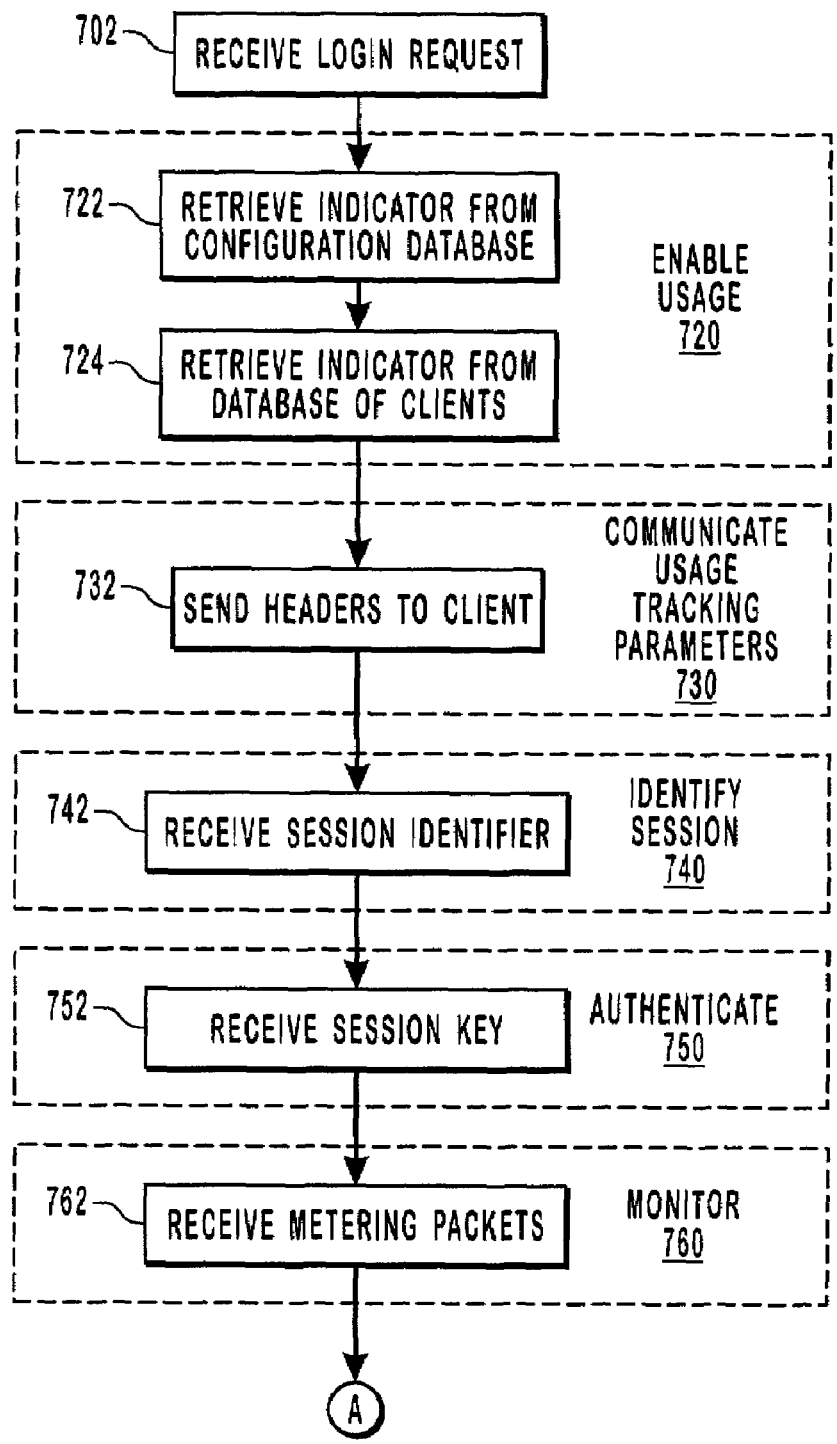
FIGS. 4A and 4B are flow diagrams, from the perspective of a server, describing various acts and steps for methods according to the present invention.
Figure 4B:
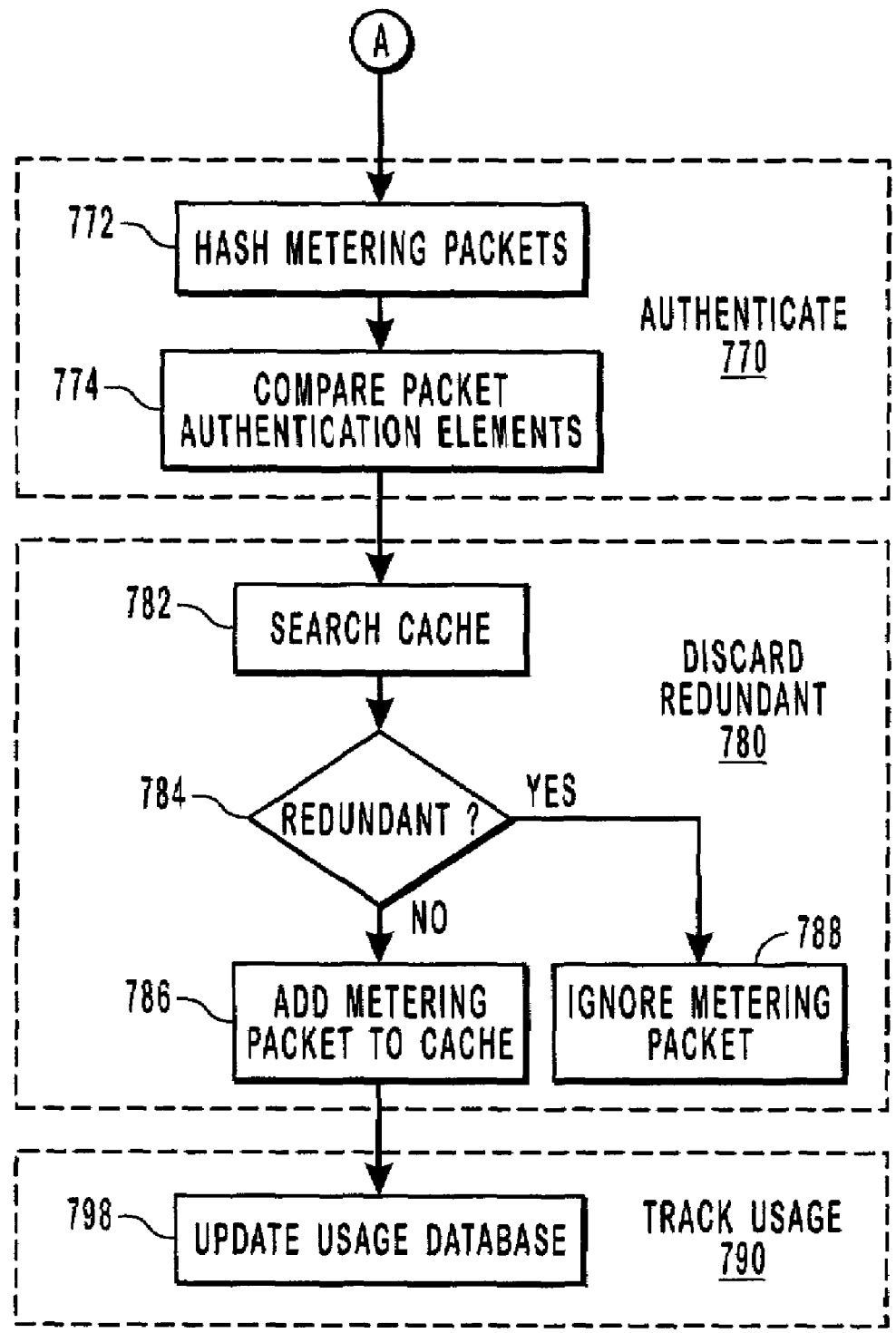

FIGS. 4A and 4B are flow diagrams, from the perspective of a server, describing various acts and steps for methods according to the present invention. The present invention may include an act of receiving (702) a login request from a client. A step for enabling (720) usage tracking may include an act of retrieving (722) an indicator from a configuration database indicating that usage should be tracked for all clients attempting to login and an act of retrieving (724) an indicator from a database of clients indicating that usage should be tracked for a particular client. An act of sending (732) one or more headers to a client may achieve the result of communicating (730) one or more usage tracking parameters to the client, including at least one of (i) an indication that the client should track usage, (ii) a unique session identifier, and (iii) a metering interval indicating how frequently the client should send metering packets.

An act of receiving a session identifier (742) may achieve the result of identifying (740) one or more sessions through which a client accesses one or more services provided by one or more servers. A step for authenticating (750 and 770) may include acts of receiving (752) a session key associated with one or more sessions; an act of hashing (772) at least a portion of each metering packet and the corresponding session key to generate an authentication element; and, an act of comparing (774) the generated authentication element with a packet authentication element included with each metering packet to determine whether or not each packet is genuine.

As noted above, in one embodiment a census service receives the session identifier and a hash of the session key from a login service at about the same time that one or more headers are sent to a client. Although not shown, the present invention also may include an act of receiving metering packets that correspond to a previously terminated session. As described with respect to FIG. 5, a client may store metering information from one session in non-volatile memory and send the stored metering information in a subsequent session. In one embodiment, the client sends the stored metering information to the login service and the login service forwards the stored metering information to the census service. Among other things, this allows the census service to accept the metering information without independently authenticating it. As a result, it is not necessary for the census service to maintain session identifiers and session keys indefinitely.

A step for monitoring (760) one or more metering packets may be accomplished by an act of receiving (762) one or more metering packets from a client, wherein each of the one or more metering packets includes a time element indicating the client's usage of the one or more services. A step for discarding (780) one or more redundant metering packets may include an act of, prior to updating a usage database, searching (782) a cache of at least one received metering packet; an act of, if a copy of a particular metering packet is found in the cache, identifying ("yes" branch of 784) the particular metering packet as redundant and not updating the usage database based on the particular metering packet or in other words ignoring (788) the particular metering packet; and, an act of, if a copy of the particular metering packet is not found in the cache ("no" branch of 784), adding (786) the particular metering packet to the cache. A step for tracking (790) a client's usage of one or more services may be achieved by an act of updating (798) a usage database based on one or more metering packets.

Figure 5:
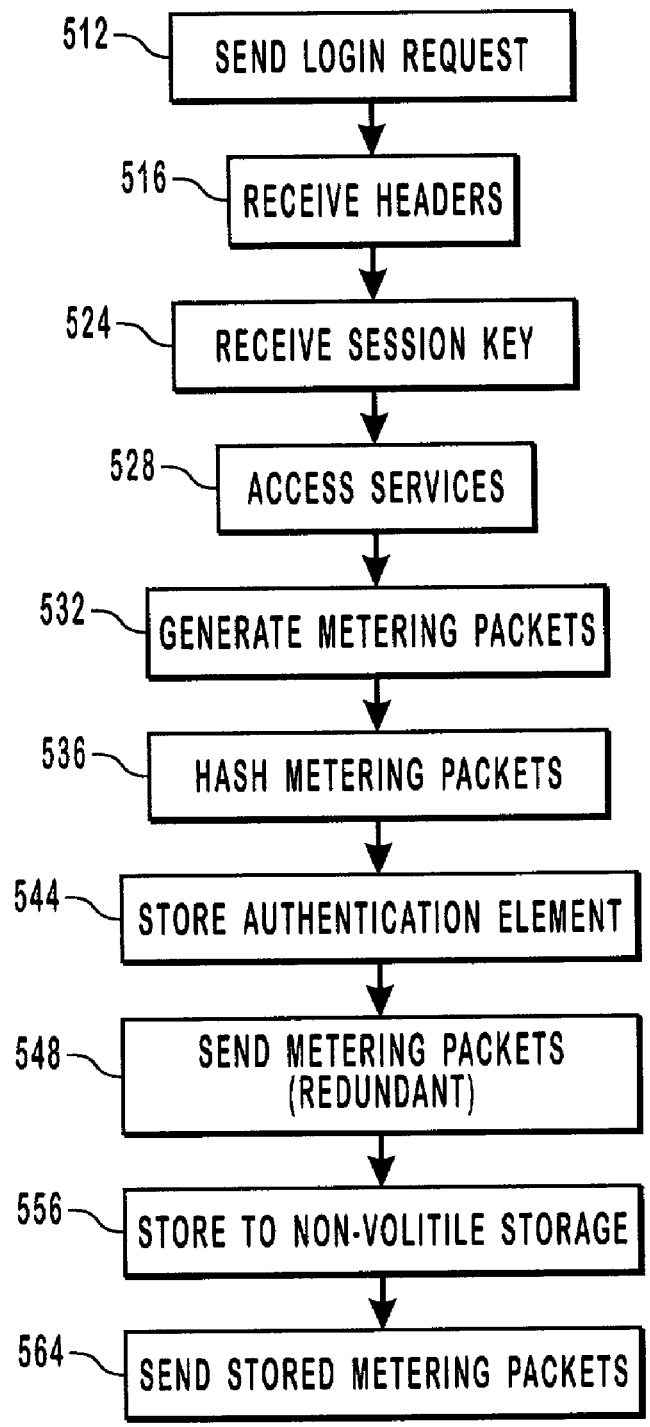
FIG. 5 is a flow diagram, from the perspective of a client, describing various acts of methods according to the present invention.

FIG. 5 is a flow diagram, from the perspective of a client, describing various acts of methods according to the present invention. The present invention may include an act of sending (512) a login request to a login service; an act of receiving (516) one or more headers from the login service including at least one of (i) an indication that a client should track usage of one or more services provided by one or more servers, (ii) a unique session identifier, and (iii) a metering interval indicating how frequently the client should send metering packets; an act of receiving (524) a session key associated with the one or more sessions (whether received in a header or in some other way); an act of accessing (528), through the one or more sessions created in response to the login request, at least one of the one or more services provided by the one or more servers; and, generating (532) one or more metering packets, wherein each of the one or more metering packets includes a time element indicating the client's usage of the one or more services.

The present invention also may include an act of hashing (536) at least a portion of each metering packet to generate an authentication element; an act of storing (544) each authentication element in the corresponding metering packet; an act of sending (548) the one or more metering packets (possibly redundant) to a census service; an act of storing (556) metering information in non-volatile memory; and, an act of sending (564) the stored metering information to the census service in a subsequent session.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computer network that comprises one or more servers providing one or more services to at least one client, and wherein the at least one client accesses the one or more services through the one or more servers during a plurality of sessions created in response to a login request from the at least one client, with at least some of the plurality of sessions occurring simultaneously, and wherein access to the one or more services during a particular session includes at least one of a charged time portion and a free time portion, a method of tracking the at least one client usage of the one or more services during each session the method comprising acts of:

receiving at one of the one or more servers one or more metering packets from the at least one client, each of the one or more metering packets being generated at the at least one client and each metering packet being used at the at least one client to store data for tracking usage of one or more services during each session, and each metering packet comprising a data structure for storing the following data:
- a session identifier element that links a particular metering packet with a particular session;
- a time element indicating the at least one client usage of the one or more services, the time element comprising a charged time portion and a free time portion, wherein the charged time portion corresponds to access to one or more services that incurs an access charge, and wherein the free time portion corresponding to access to one or more services that does not incur an access charge; and
- a sequence number element; and the one or more servers updating a usage database based on the received one or more metering packets by
- using the sequence number element to determine whether each received metering packet is redundant of any prior metering packet already stored in the usage database, and if so, discarding it, and if not, then
- storing each received metering packet that is not redundant in the usage database in order to store the data contained in each received metering packet that is not redundant, and from which it can be determined from the time element whether the at least client usage of the one or more services during the particular session for that received metering packet is a charged time portion or a free time portion.

2. A method as recited in claim 1, wherein a plurality of metering packets are received over regular, periodic intervals.

3. A method as recited in claim 1, wherein each of the one or more metering packets is one of a session-ending metering packet and a session-in-progress metering packet.

4. A method as recited in claim 1, further comprising acts of:
- receiving a session key associated with the one or more sessions;
- hashing at least a portion of each metering packet and the corresponding session key to generate an authentication element; and
- comparing the generated authentication element with a packet authentication element included with each metering packet to determine whether or not each packet is genuine.

5. A method as recited in claim 4, wherein a login service receives the login request from and negotiates a given session key with the at least one client, and wherein a census service receives the one or more metering packets, the method further comprising an act of the login service sending a hash of the given session key and a session identifier to the census service, such that the received session key is the hash of the given session key.

6. A method as recited in claim 5, further comprising:
- retrieving an indicator from a configuration database indicating that usage should be tracked for all clients attempting to login.

7. A method as recited in claim 1, wherein a plurality of metering packets are received and wherein one or more of the plurality of received metering packets are redundant, the method further comprising acts of:
- prior to updating the usage database, searching a cache of at least one received metering packet;
- if a copy of a particular metering packet is found in the cache, identifying the particular metering packet as redundant and not updating the usage database based on the particular metering packet; and
- if a copy of the particular metering packet is not found in the cache, adding the particular metering packet to the cache and updating the usage database based on the particular metering packet.

8. A method as recited in claim 7, wherein each metering packet comprises a session identifier element and a sequence number element, and wherein finding the particular metering packet in the cache is based on comparing the session identifier element and the sequence number element that are included with each metering packet.

9. A method as recited in claim 1, wherein each metering packet further comprises (i) a packet type element, (ii) a sequence number element, (iii) a session identifier element, and (iv) a packet authentication element.

10. A method as recited in claim 1, further comprising an act of sending one or more headers to the at least one client, wherein the one or more headers include at least one of (i) an indication that the at least one client should track usage of the one or more services provided by the one or more servers, (ii) a unique session identifier, and (iii) a metering interval indicating how frequently the at least one client should send metering packets.

11. In a computer network that comprises one or more servers providing one or more services to at least one client, and wherein the at least one client accesses the one or more services through the one or more servers during a plurality of sessions created in response to a login request from the at least one client, with at least some of the plurality of sessions occurring simultaneously, and wherein access to the one or more services during a particular session includes at least one of a charged time portion and a free time portion, a method of tracking the at least one client usage of the one or more services during each session, the method comprising acts of:
- in response to a login request received at one server of the one or more servers from the at least one client, a step for communicating from said one server to the at least one client usage tracking parameters;
- thereafter a step for one or more metering packets being generated at the at least one client,
- each metering packet being used at the at least one client to store data for tracking usage of one or more services during each session, and each metering packet comprising a data structure for storing the following data:
  - a session identifier element that links a particular metering packet with a particular session; and
  - a time element indicating the at least one client usage of the one or more services, the time element comprising a charged time portion and a free time portion, wherein the charged time portion corresponds to access to one or more services that incurs an access charge, and wherein the free time portion corresponding to access to one or more services that does not incur an access charge;
- said one server performing a step for identifying one or more sessions through which the at least one client has accessed the one or more services;
- the one server performing a step for monitoring metering packets that are received from the at least one client; and
- the one server performing a step for tracking the at least one client usage of the one or more services during each session based on the received one or more metering packets in order to store data from which it can be determined whether the at least one client usage of the one or more services during each session is a charged time portion or a free time portion.

12. A method as recited in claim 11, wherein a plurality of metering packets includes both a session-ending metering packet and a session-in-progress metering packet.

13. A method as recited in claim 11, further comprising a step for authenticating the one or more metering packets.

14. A method as recited in claim 11, further comprising a step for enabling usage tracking in at least one of a configuration database and a database of clients.

15. A method as recited in claim 11, wherein a plurality of received metering packets are redundant, the method further comprising a step for discarding the one or more of the plurality of received metering packets that are redundant.

16. A method as recited in claim 11, wherein each metering packet further comprises (i) a packet type element, (ii) a sequence number element, (iii) a session identifier element, and (iv) a packet authentication element.

17. A method as recited in claim 11, further comprising a step for communicating one or more usage tracking parameters to the at least one client, wherein the one or more usage tracking parameters include at least one of (i) an indication that the at least one client should track usage of the one or more services provided by the one or more servers, (ii) a unique session identifier, and (iii) a metering interval indicating how frequently the at least one client should send metering packets.

18. A computer program product for implementing, in a computer network that comprises one or more servers providing one or more services to at least one client, and wherein the at least one client accesses the one or more services through the one or more servers during a plurality of sessions created in response to a login request from the at least one client, with at least some of the plurality of sessions occurring simultaneously, and wherein access to the one or more services during a particular session includes at least one of a charged time portion and a free time portion, a method of tracking the at least one client usage of the one or more services during each session, the computer program product comprising a computer readable medium for carrying machine-executable instructions that implement the method, and the method comprising:

in response to a login request received at one server of the one or more servers from the at least one client, a step for communicating from said one server to the at least one client usage tracking parameters;

thereafter a step for one or more metering packets being generated at the at least one client, each metering packet being used at the at least one client to store data for tracking usage of one or more services during each session, and each metering packet comprising a data structure for storing the following data:

a session identifier element that links a particular metering packet with a particular session; and a time element indicating the at least one client usage of the one or more services, the time element comprising a charged time portion and a free time portion, wherein the charged time portion corresponds to access to one or more services that incurs an access charge, and wherein the free time portion corresponding to access to one or more services that does not incur an access charge;

said one server performing a step for identifying one or more sessions through which the at least one client has accessed the one or more services;

the one server performing a step for monitoring metering packets that are received from the at least one client; and the one server performing a step for tracking the at least one client usage of the one or more services during each session based on the received one or more metering packets in order to store data from which it can be determined whether the at least one client usage of the one or more services during each session is a charged time portion or a free time portion.

19. A computer program product as recited in claim 18, wherein a plurality of metering packets are received that include both a session-ending metering packet and a session-in-progress metering packet.

20. A computer program product as recited in claim 18, wherein the method further comprises a step for authenticating the received metering packets.

21. A computer program product as recited in claim 18, wherein a plurality of metering packets are received that are redundant, the method further comprising a step for discarding the received metering packets that are redundant.

22. A computer program product as recited in claim 18, wherein each metering packet further comprises (i) a packet type element, (ii) a sequence number element, (iii) a session identifier element, and (iv) a packet authentication element, and wherein the time element comprises a charged time portion corresponding to some access to the one or more services that incurs an access charge, and a free time portion corresponding to other access to the one or more services that does not incur an access charge.

23. A computer program product as recited in claim 18, wherein the method further comprises a step for communicating one or more usage tracking parameters to the at least one client, wherein the one or more usage tracking parameters include at least one of (i) an indication that the at least one client should track usage of the one or more services provided by the one or more servers, (ii) a unique session identifier, and (iii) a metering interval indicating how frequently the at least one client should send metering packets.

24. In a computer network that comprises at least one server, the at least one server providing one or more services to at least one client that accesses the one or more services through the one or more servers during a plurality of sessions created in response to a login request from the at least one client, with at least some of the plurality of sessions occurring simultaneously, and wherein access to the one or more services during a particular session includes at least one of a charged time portion and a free time portion, a method of tracking the at least one client usage of the one or more services during each session, the method comprising acts of:

a client sending a login request to a login service;

accessing, through one or more sessions created in response to the login request, at least one of the one or more services provided by one or more servers and tracking parameters corresponding to client usage of the one or more services;

generating a plurality of metering packets corresponding to a single session that each includes a time element indicating the at least one client usage of the one or more services, each metering packet being used at the client to store data for tracking usage of the one or more services during each session, and each metering packet comprising a data structure for storing the following data:

a session identifier element that links a particular metering packet with a particular session; and a time element indicating the at least one client usage of the one or more services, the time element comprising a charged time portion and a free time portion, wherein the charged time portion corresponds to access to one or more services that incurs an access charge, and wherein the free time portion corresponding to access to one or more services that does not incur an access charge; and sending at least one of the plurality of metering packets to a census service, wherein the census service updates a usage database based on the metering packets so that the usage database reflects the at least one client usage of the one or more services provided by the at least one server.

25. A method as recited in claim 24, wherein a plurality of metering packets are generated and sent over regular, periodic intervals, and wherein the metering packets includes both a session-ending metering packet and a session-in-progress metering packet.

26. A method as recited in claim 24, further comprising acts of:
receiving a session key associated with the one or more sessions;
hashing at least a portion of each metering packet and the corresponding session key to generate an authentication element; and
storing each authentication element in the corresponding metering packet.

27. A method as recited in claim 24, further comprising an act of sending redundant metering packets to the census service using a communication protocol that does not guarantee delivery.

28. A method as recited in claim 24, wherein the time element comprises a charged time portion corresponding to some access to the one or more services that incurs an access charge, and a free time portion corresponding to other access to the one or more services that does not incur an access charge.

29. A method as recited in claim 28, wherein each metering packet further comprises (i) a packet type element, (ii) a sequence number element, (iii) a session identifier element, and (iv) a packet authentication element.

30. A method as recited in claim 24, further comprising an act of receiving one or more headers from the login service, wherein the one or more headers include at least one of (i) an indication that the at least one client should track usage of the one or more services provided by the one or more servers, (ii) a unique session identifier, and (iii) a metering interval indicating how frequently the at least one client should send metering packets.

31. A method as recited in claim 24, further comprising an act of storing metering information in non-volatile memory.

32. A method as recited in claim 31, further comprising an act of sending the stored metering information to the census service in a subsequent session.

33. A computer program product comprising:
a computer readable medium for carrying machine-executable instructions that implement the method of claim 24.

34. A computer program product as recited in claim 33, wherein a plurality of metering packets are generated and sent over regular, periodic intervals, and wherein metering packets include both a session-ending metering packet and a session-in-progress metering packet.

35. A computer program product as recited in claim 33, wherein the method further comprises acts of:
receiving a session key associated with the one or more sessions;
hashing at least a portion of each metering packet and the corresponding session key to generate an authentication element; and
storing each authentication element in the corresponding metering packet.

36. A computer program product as recited in claim 33, wherein the method further comprises an act of sending redundant metering packets to the census service using a communication protocol that does not guarantee delivery.

37. A computer program product as recited in claim 33, wherein each metering packet further comprises (i) a packet type element, (ii) a sequence number element, (iii) a session identifier element, and (iv) a packet authentication element.

38. A computer program product as recited in claim 33, wherein the method further comprises an act of receiving one or more headers from the login service, wherein the one or more headers include at least one of (i) an indication that the at least one client should track usage of the one or more services provided by the one or more servers, (ii) a unique session identifier, and (iii) a metering interval indicating how frequently the at least one client should send metering packets.

39. A computer program product as recited in claim 33, the method further comprising an act of storing metering information in non-volatile memory.

40. A computer program product as recited in claim 39, wherein the method further comprises an act of sending the stored metering information to the census service in a subsequent session.

* * * * *